United States Patent Office 3,738,938
Patented June 12, 1973

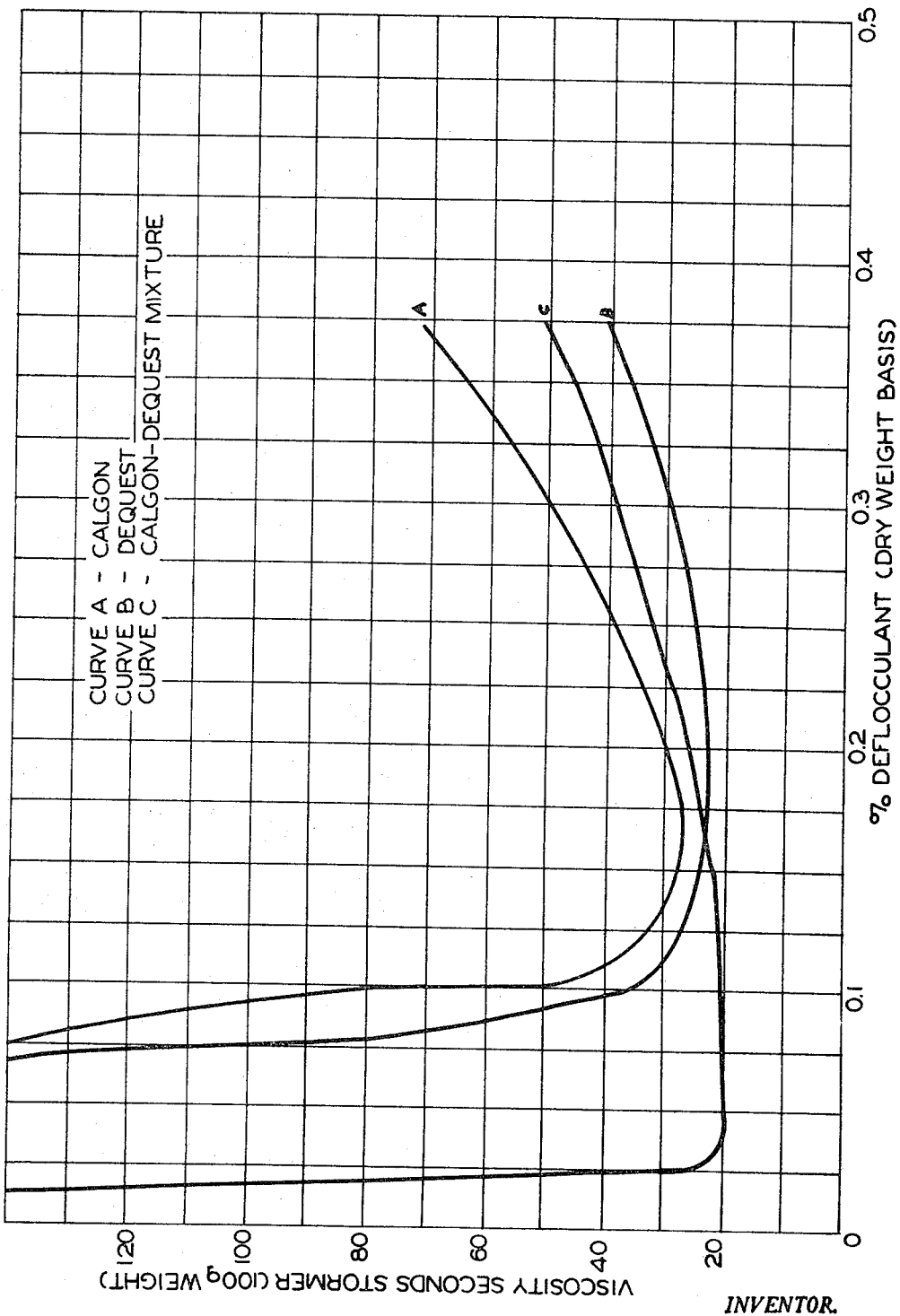

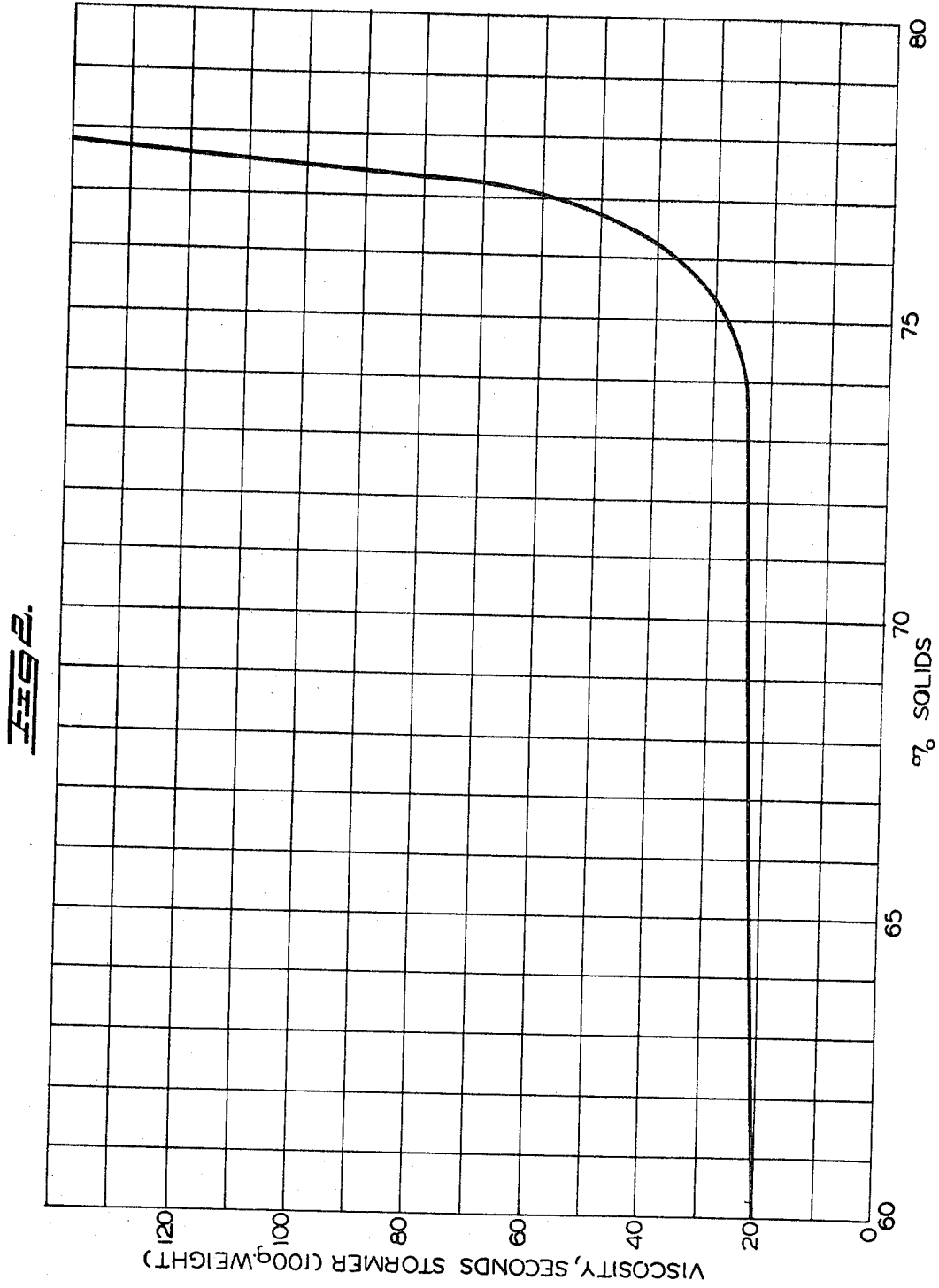

3,738,938
CARBONATE COMPOSITION AND PROCESS
Robert C. Barrett, Cartersville, Ga., assignor to
Chemical Products Corporation, Cartersville, Ga.
Original application Feb. 29, 1968, Ser. No. 709,441, now Patent No. 3,615,811. Divided and this application Sept. 29, 1970, Ser. No. 76,416
Int. Cl. C09c 1/02, 3/02
U.S. Cl. 252—188.3    12 Claims

ABSTRACT OF THE DISCLOSURE

Mixtures of alkaline earth carbonates and metal oxides, together with dispersants and binder additives are dried to provide products particularly suitable for bulk handling, storage and shipment. The product can be prepared in such manner as to have excellent dry-flow characteristics, good pellicle strength and moderately high bulk density, while retaining the small particle size of the individual crystallites of which the dried pellicles are formed. The products may be particularly adapted for use in ceramic industries and/or may be adapted for use in aqueous suspensions, in which cases they are provided with ready dispersibility and high reactivity.

---

This application is a division of copending application Ser. No. 709,441, filed Feb. 29, 1968, and now Pat. No. 3,615,811.

This invention relates to an improved alkaline earth carbonate product suitable for bulk handling, storage and shipment and adaptable to a variety of end uses. More particularly, the invention relates to an alkaline earth carbonate product which, by reason of its dry flow characteristics, high density, stability, low dusting and ready dispersibility, is useful in industrial processes wherein lumping of the carbonate, clogging of equipment therewith, dustiness and generally poor feeding and blending characteristics and similar mechanical difficulties routinely have characterized the use of barium carbonate.

In various using industries the properties characteristic of ordinary forms of barium carbonate have introduced problems peculiar to each industry; the difficulty in each instance is, however, caused by the same fundamental physical characteristics of the barium carbonate. The varied nature of the problems involved and of the prior solutions to these problems are so diverse that they will be treated here individually, by end use, though they stem from the same physical characteristics of the ordinary forms of barium carbonate.

In numerous industrial processes, the presence of water-soluble sulfates presents a problem. For example, it is often desirable to remove sulfates from salt brines. As a further example, water-soluble sulfates are most undesirable in ceramic products because they migrate to the product surfaces and form a "scum." In both of these instances, and many others, wherein the presence of sulfates is a problem, it has long been known that the addition of barium carbonate will efficaciously remove the sulfates as insoluble barium sulfate. In the ceramic industry, the addition of as little as five pounds of barium carbonate per ton of mix is often sufficient to eliminate "scumming" entirely (and "scumming" has often been responsible for rejection of 15 to 20% of the final product of a ceramic operation).

On an industrial scale, however, the employment of barium carbonate often presents problems almost as burdensome as those that it solves. Ordinary commercial grades of barium carbonate are not free-flowing. They compact readily, bridge in hoppers, clog feeding devices and "settle out" in aqueous systems. Moreover, they cannot be fed regularly into a system without the continuous attention of an operator. In ceramic processes, for example, they form lumps which are difficultly, if at all, dispersible in the clay mix. Most of the industrial processes in which barium carbonate is desirably employed require that only minute amounts, in proportion to the other ingredients present, be added. In order to achieve a uniform dispersion of barium carbonate in a semi-solid plastic system, it has often been necessary to add a large excess—an expedient which adds considerably to the cost of the process.

It has been proposed to solve these problems in the use of barium carbonate in numerous ways. Certain additives have been tried to render barium carbonate free-flowing and non-lumping. For example, addition of 10% of a synthetic magnesium silicate produces a "fluffed" product which is moderately satisfactory when freshly prepared; after storing it for any appreciable period, however, its desirable properties diminish so that it "lumps" and becomes difficult to feed. Barium carbonte having inherently free-flowing qualities, by reason of its crystal structure, has been produced and at least two such materials are known. One of these has larger than average crystals; it has the disadvantage of being considerably less reactive than normal, so that more than twice as much as usual is necessary to the accomplishment of any desired result. The other of these has much smaller than average crystals and, while desirably reactive, is of very low bulk density and, hence, unusable from a practical viewpoint in most of the currently installed industrial feeders.

It has been further proposed to add barium carbonate as a water slurry to various industrial systems. In most instances, this has proved unsuitable because barium carbonate is so heavy, that, in the absence of continuous high speed agitation, both in the slurry preparation zone and in the pipeline through which it is fed, it settles out almost instantaneously. Moreover, about one pound of $BaCO_3$ per three pounds of water is a practical limit of concentration. Thus, for example, if it is desired to add $BaCO_3$ to clay mixes in ceramic manufacture, the slurry method may introduce far more water than the system can tolerate and still remain in a semi-solid plastic state suitable for extrusion, molding or drying.

In recent years, the discovery was made that certain types of barium carbonate of limited particle size range and reactivity (which possibly depends in part on particle shape) can be dispersed in water by very small quantities of cheap and conventional dispersing agent. Moreover, if a protective colloid is also added to the dispersion so produced, it can be stabilized for a period of weeks or months without agitation. The operable size range of barium carbonate particles is from about 0.25 micron to about 2.0 microns. A particle size between 0.5 and 1.25 micron is particularly preferred. In this range, determination of particle size is extremely difficult. While the use of the electron microscope in defining such small particle sizes has progressed very far in recent years, barium carbonate is completely opaque to the electron beam and, furthermore, is intensely aggregated by ordinary drying procedures. Therefore, "average particle size," as used in this application, is, unless otherwise specified, defined by a dye absorption method developed by Kolthoff and MacNevior and set forth in J. Am. Chem. Soc., 59, 1639–1643 (1937), which method is based on the absorption of wool violet dye by the particles.

The barium carbonate particles which may be so employed to form dispersions must also have a reactivity of at least about 65%. As used in this application, "reactivity" is defined as that percent of barium carbonate which will react with an excess of calcium sulfate, present as an 80% saturated (at room temperature) solution, operated at 20 p.s.i.g. The product was a generally free-under a reflux.

Barium carbonate is frequently produced commercially by the interaction of barium sulfide and carbon dioxide or sodium carbonate. When so produced, it is flocculated or aggregated to a considerable degree, even after drying and strenuous grinding. The coarse crystalline barium carbonate, which is produced by the interaction of carbon dioxide with barium sulfhydrate or by the interaction of carbon dioxide and barium sulfide in a countercurrent flow reactor, does not flocculate but forms in very large particles. It appears that the physical properties of barium carbonate, both in its dry state and in the conventional aqueous slurries of the prior art, are a function of the size of the aggregates rather than of the ultimate size of the individual particles or crystals which makes up the aggregates.

When barium carbonate aggregates are deflocculated to their ultimate particles or crystals and, hence, are able to demonstrate the physical properties characteristic of their very fine ultimate particle size, the behavior of barium carbonate in an aqueous dispersion is completely unlike its ordinary behavior in aqueous slurries. Thus, ordinary dispersants will act to deflocculate some barium carbonate aggregates to crystal sizes at which they will form stable dispersions.

The dispersants which operate to break up certain barium carbonate aggregates and to disperse particles thereof are those conventional dispersing agents which do not themselves flocculate barium carbonate in aqueous systems. Thus, for example, the alkali metal mahogany sulfonates, which contain a large non-polar hydrophobic group attached to a comparatively small hydrophilic group have a flocculating effect upon aqueous barium carbonate systems; this is true of all similarly constituted conventional dispersants. If, however, the dispersant molecule is mainly hydrophilic in character, whether cationic, anionic or nonionic, it will produce a stable homogeneous aqueous dispersion of barium carbonate. Thus, operable dispersants include many conventional water-softeners, such as the alkali metal and ammonium phosphates, including metaphosphates, pyrophosphates, polyphosphates, etc., the lignosulfonate soaps, the lignin-containing by-products of paper manufacture, cellulose purification, and similar processes, etc. Also useful are those anionic, cationic and nonionic surfactants which are characterized by highly hydrophilic behavior, e.g., polyoxy alkylenes, polyalcohols, poly(oxyalkylene) amines, amides, sulfates, phosphates, thiols, alcohols, carboxylates, etc. Numerous other operable dispersants will readily occur to those skilled in the art. Accordingly, the term "dispersant," as used in this application, connotes those conventional dispersants which are hydrophilic in behavior when placed in aqueous systems with barium carbonate.

When the dispersions are to be shipped or stored for long periods, it is also advantageous to incorporate in them a protective colloid to enhance their stability. As with the dispersants, the suitable protective colloids are the various materials known in the art for such purpose. Examples of such materials include bentonite; cellulose gums, such as carboxymethyl cellulose, hydroxyethyl cellulose, carboxymethylhydroxyethyl cellulose, etc.; starches; proteins, such as gelatin, albumin, etc.; vegetable gums, such as gum arabic, gum kharays, gum ghatti, locust bean gum, gum tragacanth, etc.; dextrin; Irish moss; methyl cellulose; water-soluble synthetic resins, such as polyvinyl alcohol, polyvinylpyrrolidone, and the like.

Moreover, as will be appreciated, certain materials may function both as a dispersing agent and as a protective colloid. Notable among these are starches, vegetable gums and cellulose gums.

While there are no critical criteria for additives theoretically other than that they must exhibit a hydrophilic behavior overall, from a practical point of view, some dispersants and colloids will be more desirable than others with respect to cost, resistance to bacterial attack, resistance to hydrolysis, etc. It is, of course, possible to tailor the additives to the nature of the system to which it is desired to add the $BaCO_3$. Thus, if the product is to be used in systems where phosphates are undesirable, organic dispersants and modifiers may be used. Similarly, polyphosphates and bentonite are particularly suitable additives when it is desired to employ the $BaCO_3$ in ceramic fluxes. As a further example, if it is desired to employ the dispersions to remove sulfate from products ultimately intended for medicinal purposes or human consumption, edible starches and gums are desirable additives.

The manner of mixing the barium carbonate with the dispersant and/or protective colloid chosen is not critical. The ingredients can be admixed in a substantially dry state and stored that way until it is desired to form a dispersion. Alternatively, they can be admixed with water simultaneously, or separately, in any order, and the mixture agitated to produce a stable dispersion.

Among the many striking properties of the above described $BaCO_3$ dispersions is that they exhibit enhanced reactivity with sulfates as compared to non-dispersed barium carbonate particles of the same 0.25 to 2.0 micron particle size. Further, these $BaCO_3$ dispersions occupy less cubic volume per pound of carbonate than even the most dense and non-reactive dry $BaCO_3$. Thus, a dispersion containing 80% solids and produced as described above, had a $BaCO_3$ content of 130 pounds dry weight per cubic foot of dispersion. This amount of $BaCO_3$, when dry, normally occupies two cubic feet.

The above-described problems with barium carbonate are found to greater or lesser extent with all of the alkaline earth carbonates, including calcium carbonate, magnesium carbonate and strontium carbonate. Stable dispersion of these carbonates can also be prepared in the manner described.

While the aforementioned stable dispersions of high solids concentrations have met with great commercial success and are extremely effective for the uses discussed above, it would also be desirable to have a relatively high bulk density carbonate product in solid form which, however, had a high reactivity, good flowability, substantial freedom from dusting and which would be readily dispersible in liquids, much as water. Such a product can now be obtained in accordance with the present invention by the spray drying of the aforementioned high solids dispersions. In particular, a dispersion is prepared containing not less than about 50% solids by weight by mixing (1) A major amount of barium carbonate, having
 (a) an average particle size of from about 0.25 to about 2.0 microns as determined according to the dye absorption method, and
 (b) a "reactivity" of at least about 75%, "reactivity" being defined as the percentage of carbonate which will react with calcium sulfate (as an 80% saturated solution at room temperature) within a 24-hour period when subjected to a gentle boil under reflux;
(2) a minor amount of water;
(3) an amount sufficient to disperse the carbonate in said water, but not exceeding about 2% by weight of the carbonate present, of a dispersant characterized by a markedly hydrophilic behavior in aqueous systems, and
(4) a suitable binder;

and agitating the mixture so formed. The dispersion is then spray dried under conditions to be discussed subsequently in a suitable spray drier, such as the laboratory tower spray driers of the Bowen Engineering Corporation. The spray-dried product is in the form of generally spherical particles of a good particle strength with a very uniform particle size falling generally in the range of −30 mesh to +300 mesh. The bulk density of the product may range as low as about 75 lbs./cu. ft. up to about 150 lbs./cu. ft. In general, the tapped bulk density will exceed about 85 lbs./cu. ft. The individual particles are characterized by a specific gravity (as determined by the mercury immersion technique) exceeding 40% of the theoretical value for the particular particle composition. The product, despite its high density, is highly reactive, readily dispersed and very low dusting and very free flowing.

The binders, which are useful for the purposes of the present invention, may be broadly described as those binders which can be dried to a film from an aqueous or a stable aqueous suspension. A typical technique for measuring this characteristic is the application of such solution or suspension to a glass plate by means of a doctor blade, and permitting the material to dry thereon. Among the useful binding agents will be found bentonite, polyvinyl alcohol, the several sodium and/or potassium silicates, sugar, starches, dextrins, paper mill by-products, polyvinyl pyrrolidone. It will be recognized that a number of these materials were used in prior art dispersions or suspensions as protective colloids. In the case of the present invention, however, it is not for this function, but for their binding characteristics that they are employed. Stabilization of dispersion and suspensions is not a sine qua non in the use of spray dried materials of the present invention, as will be shown subsequently herein. Many uses of the product of the present invention do not even involve the preparation of a suspension or dispersion, and of those uses which do, the dispersions or suspensions are prepared just prior to use. Long-term stability is not, therefore, a problem or requirement in the use of the product of the present invention.

As a general proposition, the minimum amount of binding agent has been found to be about 1 percent, based on the dry weight of the barium carbonate in the dispersion. It should be recognized, however, that some of the more efficient binding materials may be employed in smaller quantities. There is no significant upper limit for the amount of binder which is effective, although it should be kept below about 5 percent. As a practical matter, however, the quantity of binder should be kept below about two percent. It should further be recognized that the binding material employed may be a mixture of two or more binders, and indeed as will be shown, for some purposes a mixture is preferred.

The invention will be understood with reference to the following examples which illustrate the preferred embodiments of the invention.

EXAMPLE 1

A barium carbonate feed was prepared which consisted of 2,000 parts by weight of barium carbonate powder, 20 parts by weight of deflocculant (Dequest) at 25% solids, 13 parts by weight bentonite clay and 487 parts by weight of water. The feed was thoroughly mixed to provide a slurry of 80% solids and having a specific gravity of 2.515. The slurry was fed to a Bowen Laboratory tower spray drier at a temperature of 100° F., a pressure of 30 p.s.i.g. and at a feed rate of 100 ccm. per minute. The inlet temperature of the spray drier was 500° F. with the outlet temperature maintained at 335° F. The drier was direct gas heated. The atomizer operated with air pressure of 40 p.s.i.g. The product, which was obtained in the form of firm generally spherically spray-dried particles, exhibited a loose bulk density of 93.1 lbs./cu. ft., a tapped bulk density of 105.8 lbs./cu. ft., an angle of repose generally below 40°, and when added to water, readily produced a 75% solids dispersion having a viscosity of approximately 54 cps.

EXAMPLE 2

The procedure of Example 1 was repeated except that the amount of water in the feed was increased to 657 parts by weight to provide a slurry having a specific gravity of 2.41. This slurry was fed to the drier at a pressure of 8 p.s.i.g. with a feed rate of 105 ccm. per minute. The air pressure in the atomizer was 100 p.s.i.g. The resulting product had a loose bulk density of approximately 85 lbs./cu. ft.

EXAMPLE 3

A feed corresponding to that employed in Example 2 was employed in the process of Example 2 except that the pressure of the feed to the spray drier was 25 p.s.i.g. and the feed rate was 150 ccm. per minute. The inlet temperature in the spray drier was increased to 750° F. and the outlet temperature was decreased to 330° F. The resulting product had a loose bulk density of about 85 lbs./cu. ft.

EXAMPLE 4

A feed corresponding to that employed in Example 2 was employed in the process of Example 2 except that the pressure of the feed to the spray drier was 20 p.s.i.g. and the feed rate was 190 ccm. per minute. The inlet temperature in the spray drier was increased to 985° F. and the outlet temperature was increased to 415° F. The resulting product has a loose bulk density of about 85 lbs./cu. ft.

EXAMPLE 5

A feed was prepared corresponding to that of Example 1 except that the amount of water was increased to 2,019 parts by weight to provide a slurry containing 64% solids and having a specific gravity of 1.993. The slurry at a temperature of 150° F. was fed to the spray drier with a pressure of 20 p.s.i.g. at a feed rate of 450 ccm. per minute. In the spray drier the inlet temperature was at 995° F. The atomizer was operated with air pressure of 100 p.s.i.g. The product which was collected had a loose bulk density of 75.0 lbs./cu. ft. and a tapped bulk density of 96.0 lbs./cu. ft. An aqueous suspension was easily prepared from the product at 75% solids which had a viscosity of about 64 cps.

EXAMPLE 6

A barium carbonate feed was prepared consisting of 2,000 parts by weight of barium carbonate powder, 20 parts by weight of deflocculant (Dequest) at 25% solids, 40 parts by weight of aqueous sodium silicate at 35% solids and 657 parts by weight of water. The feed was thoroughly mixed to provide a slurry of 75% solids having a specific gravity of 2.310. This slurry was fed at a pressure of 33 p.s.i.g. at a feed rate of 140 ccm. per minute to the above-described spray drier. The spray drier was maintained at an inlet temperature of 700° F. and an outlet temperature of 340° F., with the air pressure in the atomizer at 100 p.s.i.g. The resulting product had a loose bulk density of 82.1 lbs./cu. ft. and a tapped bulk density of 99.0 lbs./cu. ft. and made up easily to an aqueous dispersion of 75% solids having a viscosity of 75 cps.

EXAMPLE 7

Following the same general procedure described in the previous examples and employing the same type of equipment, a feed slurry consisting of barium carbonate dispersed in water at 50% solids concentration (specific gravity of 1.595) and containing 0.4% deflocculant (Dequest) and 0.64% bentonite (both weight percents based on weight of barium carbonate) was fed to the spray drier which had an inlet temperature of 1000° F. and an outlet temperature of 450° F. The atomizer was operated at 20 p.s.i.g. The product was a generally free-flowing powder of approximately 150 mesh size.

EXAMPLE 8

Following the same general procedure described in the previous examples and employing the same type of equipment, a feed slurry consisting of barium carbonate dispersed in water at 66% solids concentration and containing 0.15% deflocculant (Dequest) and 1.0% sodium silicate (both weight percents based on weight of barium carbonate) was fed to the spray drier at a pressure of 10 p.s.i.g. and a feed rate of 420 ccm. per minute. The spray drier had an inlet temperature of 1000° F. and an outlet temperature of 320° F. The atomizer was operated at 20 p.s.i.g. The product was a generally free-flowing powder of approximately 150 mesh size which had a loose bulk density of 78 lbs./cu. ft. and a tapped bulk density of 98 lbs./cu. ft.

In the foregoing examples, conventional barium carbonate was employed, viz., carbonate produced by the usual chemical reactions following which the product is recovered by, for example, filtering, then washed and dried. By the present invention, however, it is possible to omit the steps of drying and to take the barium carbonate from the filter at 50% solids or higher, e.g., 60-75% solids and prepare it directly for spray drying. The filter cake product, while non-fluid in nature, may be mixed with any of the dispersants identified previously without the addition of further liquid to provide a fluid dispersion having a viscosity less than about 100 cps. and possibly on the order of 65 cps., or lower. The binder may be introduced into, or mixed with, the barium carbonate simultaneously with the introduction of the dispersant or subsequent thereto. The fluid mixture is then ready as feed for the spray drier to provide a free-flowing dried product.

The process of the present invention is not restricted to predominantly barium carbonate compositions but may be applied to compositions having barium carbonate as a substantial component. Thus, for example, barium carbonate and iron oxide in ferrite-forming proportions and typically in proportions corresponding to a molecular ratio of ferric oxide to barium carbonate in the range of about 4:1 to about 10:1 can be brought into aqueous suspension in the manner described and the suspension spray dried. The resulting product is a free-flowing, unreacted mixture which, however, may be fired directly to barium ferrite but which, more importantly, may be easily suspended for slip casting or otherwise shaping. The slip cast or otherwise shaped products may then be fired to provide ferrite products of complex shape. These ferrites are of particularly superior magnetic properties.

The following is an example of this aspect of the invention:

EXAMPLE 9

A feed was prepared consisting of 16 parts by weight of barium carbonate, 83.5 parts by weight of ferric oxide, 0.2 part by weight of Dequest 2006 as a dispersant, 0.5 part by weight of bentonite as a protective colloid-binder and to this mixture as a whole sufficient water to produce a slurry containing 73% by weight solids, at a specific gravity of 2.540. This slurry was fed at room temperature to a spray drier at a feed rate of 350 ccm. per minuute. The spray drier was maintained with an inlet temperature of 1000° F., and outlet temperature of 340° F. and atomized pressure of 20 p.s.i.g. The resulting product consisted of red, generally spherical particles, which were free-flowing and highly suited for pressing to shapes which could be fired to produce finished shaped objects. The pellets also readily redispersed in water. The dispersions of the product in water at 75% solids concentration and higher could be readily slip cast to form shaped products which could then be fired to the ferrite form with excellent reaction between the barium carbonate and the iron oxide.

The above described process can also be employed for the manufactuure of a number of complex, mixed metal oxide compounds which involve the reaction between barium carbonate and a metal oxide or carbonate or other compound decomposable to the oxide at firing temperatures. Barium carbonate-titanium dioxide mixtures in barium titanate-forming proportions may also be advantageously treated by the method of the present invention.

In the foregoing example, the barium carbonate product was dispersed in an aqueous liquid to show the high degree of dispersibility of the product. In view of the unusual nature of this product, however, and in particular, the combination of free-flowing characteristics, high degree of reactivity and ready dispersibility, the product can be fed directly to its intended use without first dispersing it in liquid. Because of its free-flowing nature, it can be metered in the usual manner available with free-flowing solids. In view of its ready dispersibility, it is not necesary to preliminarily disperse the material prior to use. Thus, dilution of the system to which the barium carbonate is to be added not only can be minimized, it can in some instances, actually be reduced. With reference in particular to the ceramic industry, the solid product obtained in accordance with the present invention can be metered directly to ceramic slips to react with sulfates contained therein and without the addition of further liquids to the system. In many instances, of course, as will be known to those skilled in the art, it may be preferred to add the barium carbonate in aqueous suspension. It is merely pointed out that such is not an essential requirement for the use of the novel product of the present invention as it is with the prior art barium carbonate materials.

In addition to overcoming problems associated with the use of barium carbonate in aqueous systems, the present invention also is useful for producing barium carbonate in the form of free-flowing pellicles of high bulk density, suitable for bulk storage and transport. For example, barium carbonate is a raw material in the manufacture of traditional ceramics, glass, frits and enamels. For these uses the raw materials are normally blended dry to produce a dry premix which is then fused or melted, as in glass or frit furnaces, to produce the finished ceramic product. For such uses, conventional carbonate is excessively dusty, leading both to health hazards and excessive dusting loss from the glass furnaces. Moreover, the loss from the glass furnace constitutes not only an economic loss of raw materials, but also is very destructive of the ceramic structure of the furnace and its accessories, heat exchangers, stacks and the like. This damage stems from the fact that under furnace conditions, barium carbonate decomposes to produce barium oxide, an alkaline material capable of vigorous attacks in most ceramic materials. Moreover, the non-free-flowing nature and low bulk density of the normal forms of barium carbonate as precipitated interdict the use of bulk handling and storage facilities. Furthermore, the fine particle size of even the coarsest of conventional forms of barium carbonate leads to difficulties of blending with the coarser components of conventional glass batches, as well as introducing tendencies to segregate or sift out of the blends so produced. Since even at best the fused mass of glass is highly viscous liquid, and diffusion currents within the glass furnace are slow, it is of utmost importance in the production of a quality product that uniform mixtures of raw materials be produced, that none of any ingredient be lost, and that mixing not be followed by segregation.

As a consequence of these requirements, it is customary in the barium carbonate industry to produce a special grade of material for the ceramic industry be calcining the barium carbonate as normally produced to the temperature of incipient fusion. This calcined product consisting of very hard lumps and aggregates, is ground and screened to produce a product having a desirable range of particle sizes combined with adequate bulk handling capabilities. This far from ideal process is costly and difficult to control and succeeds in producing a product which, at best, is barely acceptable. The process is highly corrosive, leading to serious attack on the kiln linings even when costly, special kiln linings made from highly refractory materials are employed. The attack on the linings introduces into the barium carbonate product highly refractory particles leading to imperfections in the ultimate glass product for which the barium carbonate was prepared. Moreover, the milling of the calcined barium carbonate must be rigorously controlled so as to eliminate the inclusion of oversize particles which would require very long furnace dwell for complete reaction; at the same time, excessive fines must be avoided. These two requirements can only be compromised, the best products containing undesirably large numbers of coarse particles and almost intolerable amounts of dusts. Typical screen analyses of the calcined material, glass-makers' sand, and the product of the present invention are presented in Table I. In the table all of the screen sizes are Tyler standard series.

TABLE I

| Screen analysis: | Calcined screened | Spray dried | Glass-makers' sand |
|---|---|---|---|
| +10 | [1] 0.0 | | |
| +14 | [1] 1.9 | | |
| +20 | [1] 15.7 | | |
| +28 | [1] 35.0 | .7 | 5.6 |
| +48 | 59.3 | 13.6 | 66.6 |
| +70 | | 55.7 | 86.6 |
| +100 | 76.8 | 80.9 | 94.7 |
| +140 | 82.5 | 96.4 | 99.2 |
| −140 | [2] 17.5 | 3.6 | |

[1] Undesirably coarse particles.
[2] Excessive dust.

All of the material of +28 and coarser screen size represents undesirably coarse material. Through 140 mesh material represents undesirable dust. As is evident from Table I, the calcined screened product not only had large quantities of coarse particles, but was quite excessive in dust content when compared to the spray dried product of the present invention or to the usual glassmakers' sand. Thus, prior to the present invention, the user of calcined barium carbonate has had to contend with quality problems engendered by both (1) the unwanted but unavoidable coarse, slow-melting particles and fragments of refractory, and (2) the dusty fine fractions with their concomitant control problems, economic loss, and excessive attacks on glass furnace arches and heat exchange checkerworks.

The significance of the present invention may be more readily appreciated by review in greater detail of the production of calcined material for the glass industry. Barium carbonate in water suspension is dried and then subjected to high temperatures so that crystalline growth occurs, yielding a material composed of particles measuring many microns in size. These particles are in relatively large irregular lumps which can be mechanically ground to meet the specifications of the glass industry.

The above process is laborious and expensive. It can be accomplished in two stages where the water is removed at low temperatures and the dried material is then transferred to a ceramic-lined rotary kiln (or some suitable substitute process) where it is heated to about 1600–1700° F. The fuel efficiency is very low, the ceramic lining is both expensive and of limited life and the deterioration of it leads to extensive contamination of the barium carbonate. The two processes can be combined if the high temperature kiln is sufficiently large to allow the wet material to be fed into the back of it. This accomplishes a fuel saving, but limits the capacity of the kiln and tends to decrease the life of the ceramic lining, due to excessive spalling.

The industry makes and sells approximately 60,000 tons per year of barium carbonate. It is estimated that 40% of this material must be prepared by the method just described. A reasonable estimate of preparing this calcined material over regular dried material, including investment, repairs, fuel, etc., is several dollars per ton. In some cases it is greater where the manufacturer is unable to meet the specification of the glass industry and has to mechanically remove a measurable proportion of his production in the fine particle size range, which the glass industry finds objectionable. This is an expensive process and the material removed has a limited sale. Under adverse market conditions, it would be difficult to sell at a reasonable price. A typical particle size specification for barium carbonate by the glass industry is as follows:

| Mesh size | Cumulative percent retained |
|---|---|
| 20 | None. |
| 30 | 10% maximum. |
| 140 | 85% minimum. |

Even the above specification represents a compromise, since it permits both more fines and more coarse size material than is normally found in the glassmakers sand with which it is mixed and which normally constitutes the largest percentage of the batch composition. A more realistic particle size distribution for the barium carbonate, and one which would more closely match that of the sand with which it is mixed, would be as follows:

| Mesh size | Cumulative percent retained |
|---|---|
| 20 | None. |
| 30 | 2% maximum. |
| 40 | 20% maximum. |
| 100 | 95% minimum. |

The draw-balks of the process just described (which process represents a compromise both from the standpoint of production costs and product properties) can be overcome by the production of spray dried barium carbonate of the present invention. The process of drying a slurry of barium carbonate in the presence of suitable dispersing and binding agents, which slurry has first been converted into droplets of suitable size and dried in a countercurrent or mixed-flow spray dryer, permits the variation in particle size almost at will, so as to produce reasonably and accurately any commercial screen size desired in the ranges normally preferred by the glass and other segments of the industry which utilize barium carbonate as a batch ingredient to produce vitreous compositions.

When barium carbonate is deflocculated in the manner previously described, and spray dried under certain narrowly limited conditions, particles having very desirable combination of size range, free-flowing properties and freedom from dustiness, together with strength and physical stability sufficient to permit bulk shipment, storage and use are produced. The bulk density of these products is remarkably enhanced and brought into an acceptable range. In general, our process of spray drying for this use involves the following steps:

(1) Filtering from the mother lye a precipitated barium carbonate and washing to remove the mother lye. The barium carbonate may be produced, for example, by reacting a solution of barium sulfide with sodium carbonate (either solid or predissolved), or by reacting the barium sulfide solution with carbon dioxide, either pure or diluted in the presence of nitrogen, as in flue gas. The particle size and characteristics must be selected and correlated in a manner to permit a slurry prepared therefrom to be handled in any particular spray drier. This, of course, is a matter of design engineering of which the spray drying art is cognizant. The filter cake must be substantially free of electrolytes and may be further thickened, partially dried or admixed with recirculated dry material to increase the solids content to the desired level.

(2) To the filter cake is added the minimal quantity of deflocculant necessary to produce substantially complete deflocculation of the filter cake. This minimal quantity varies with different deflocculants. It may be experimentally determined by adding different quantities of such deflocculants to a standard quantity of barium carbonate and agitating it therewith. The viscosity of the resultant deflocculated mass in any consistent unit when plotted against the amount of deflocculant will normally yield a curve such as that of FIG. 1. The amount used will normally be the smallest amount on the lower, almost level, portion of such a curve. It has been found that many desirable deflocculants will exert a synergistic action and that when used in admixtures, the minimum amount of such a mixture may be significantly less than that required for either used alone.

(3) The highly fluid pulp, if it is not already in a suitable range of solids content preferably above 65%, will be brought into such a range either by thickening, as by settling and decantation of a portion of the water, or by evaporation of a portion of the water, or by addition of previously dried material. Such previously dried material may consist of either bag collector dust or of an unwanted particle size fraction of material, either undesirably fine or coarse. Since it is not necessary either at this stage or in later use to maintain this material in a fluid condition in an unagitated state, it is not necessary to add a thickening agent to prevent settling. However, a binder for the pellicle is necessary; as noted many suitable binders are also thickening agents, e.g., bentonite, carboxyl methyl cellulose, polyvinyl alcohol, polyvinylpyrrolidone, etc.

(4) The highly fluid high solids content is dried in a spray drier under closely controlled conditions.

The optimum system for a successful spray drying process for this use includes:

(1) The highest possible solids content compatible with the atomization system employed, not less than about 50%.

(2) Effective and substantially complete deflocculation of the barium carbonate.

(3) Barium carbonate generally in a particle size range below about 5 microns. If the final product is to be used in the preparation of aqueous suspension, the barium carbonate particles should be below about 2 microns, and, preferably, in the range from about 1.5 microns to about 0.25 microns. In this application the absolute range of particle sizes is critically dictated only by the end use of the product. For glass and frit or melting applications, the upper limit of size is not as critical as for solid-solid or aqueous suspension reactions.

(4) A combination of defloccultant and binder which:

(a) maintains a fluid condition within the drying particle to a solids content substantially above that at which spraying is accomplished.
(b) does not melt or form a water vapor-impervious film, at least before the drying stage is substantially complete.

(5) An atomizing system capable of yielding a suitable size range of droplets directly (i.e., without relying on post-spraying coalescence), which droplets will yield a desirable size range of dried particles.

(6) A drier configuration and inlet drying gas temperature such that all drying is accomplished by "partial pressure drying mechanism," i.e., without exceeding the free boiling point of water within the droplet at any point in time during which a continuous water phase still exists.

(7) A drier configuration and exit gas and product conditions such that substantially a "bone dry" product is discharged to final storage.

(8) The binder-deflocculant combination is substantially non-hygroscopic, or, if hygroscopic, does not yield "tacky" surface conditions at low moisture contents.

If conditions 1 and 2 are not met, the pellicles formed by spray drying are porous and fragile and, in bulk, demonstrate poor flow properties and low bulk density. If condition 3 is not met, difficulties result in operation with settling in tanks and lines, together with clogged nozzles and fragile low density pellicles in the case of very large particles, and too high viscosity in the desired solids range in the case of small particles.

If condition 4a is not met, particles will have "shrinkage voids" within their structure and have low bulk density. If the binder-deflocculant combination produces a water vapor impermeable film prior to the substantial elimination of all water from the structure, the particle may fragment, due to internal pressure or expand and produce "expansion voids" with much lower bulk density.

However, even fairly satisfactory binders may produce somewhat "dimpled" or "imploded" pellicles, and, in fact, this may indicate the substantial attainment of requirement 3. The highest possible solids compatible with pumping and atomization tends to minimize such external effects of shrinkage.

The atomizer must be mated to the liquid properties and the particle size requirements. The products, as sprayed, contain only a very small quantity of water and have very little tendency to coalesce in flight. However, since the volume of particles and hence the amount of water contained per particle increases as the cube of its dimensions, and the surface area which controls the heat transfer surface only as the square, it is essential that the nozzle produce minimal quantities of oversize particles which might reach the walls undried and adhere thereto. The selection of the nozzle size and type of spraying system is thus determined empirically. Both two-fluid and direct high pressure type spraying systems have been successfully employed. Wheel type automization systems produce materials only in the lower range of particles sizes.

If condition 6 is not met, and drying is accompanied by exceeding the free boiling point of water within the droplet, very fragile "exploded" droplets will be produced. In the extreme, failure to meet this requirement will result in the production of the impalpable powder usually considered characteristic of a spray dried material produced from a slurry of fine crystals. This condition can be most readily met by the use of the drier configuration normally referred to as "mixed flow" or "counter current" type driers.

If condition 7 is not met, difficulties will be encountered in bulk handling and storage equipment. The temperature gradients, which invariably exist in such systems, will result in differences of vapor pressure of any residual contained moisture. The vapor, which is saturated in a warmer area, will be supersaturated and condense in cooler areas, producing condensation. The result will be caked, or even pulpy, wet materials on the walls of the storage or transport equipment. This "sweating," which may result when apparently quite dry materials have been placed in bulk storage equipment, has caused the failure of many attempts to handle powdered dried products in bulk. Even when condition 7 is met, it may be desirable to cool and aerate the product before storage to equilibrate both temperature and moisture conditions throughout the mass of material.

If condition 8 is not met and the binder-deflocculant system is hygroscopic, lumping or caking will accentuate the difficulties described under 7. Furthermore, under pressure and vibration, a transient form of borderline caking will result in poor flow properties, resulting in failure of hoppers to discharge and irregular feeding in handling equipment.

EXAMPLE 10

Barium carbonate (produced by flue gas precipitation in the form of a filter cake at approximately 60% solids from barium sulfide), having an average particle size by the dye absorption test of about 0.95 micron was deflocculated with approximately 0.2% of Dequest 20006 (a complex phosphorous deflocculant produced by Monsanto Chemical Company). To this was added a sufficient amount of previously dried barium carbonate of a similar nature to raise the solids content into the range of 70–75%. Immediately prior to spray drying, sufficient sodium silicate (having a ratio of $Na_2O:SiO_2$ of 1:3.2 in the form of a 41° Baumé solution) was added to produce a suspension containing about 0.8% of such sodium silicate on the dry weight basis. The feed so prepared was fed into a spray drier through a direct pressure nozzle (Whirljet (3Ch-2) produced by the Spraying Systems of Bellwood, Ill.). Nozzle pressure was 1500 p.s.i. and the feed rate was 1200 lbs./hour of barium carbonate. The spray drier was a Proctor & Schwartz unit, 10 ft. in diameter and 12 ft. high. The unit was arranged in "mixed flow" configuration in which the feed is sprayed "fountainwise" vertically upward in the direction of the hot gas flow; under the force of gravity it falls downward against the direction of hot gas travel, to be discharged at the bottom. Over 90% of the product was discharged at the bottom with lesst han 10% carried overhead to the secondary dust collectors. The inlet gas temperature was 530° F., and the outlet gas temperature was 257° F. The product temperature was 180° F. No significant coherent buildup of material occurred on the drier wall. The moisture content of the product, determined on a sample caught in a small bottle and maintained sealed until the determination of moisture was 0.21%. Casual drying during cooling of the bulk of the production by aeration reduced this below 0.1%.

The product taken from the bottom of the drier was an extremely free-flowing granular solid generally in the form of small, discrete, generally spherical particles. The screen analysis of this product is set forth in Table I. Some of the particles were distorted, pear shaped, tailed or discoidal, and some showed small "sucked-in" dimples or pits. A detailed discussion of its physical properties is given later under testing methods.

EXAMPLE 11

Filter cake, not deflocculated, but at 65% solids, was spray dried, using a two-fluid nozzle and using a wheel type disintegrator. The product, in both cases, was an impalpable powder highly suitable for many chemical uses, but entirely unsuited for bulk transport or feeding.

EXAMPLE 12

Material substantially equivalent to Example 10, but without binder, was spray dried as in Example 10. The product was an impalpable powder, containing some extremely fragile particles. It was more free-flowing than that of Example 11, and readily deflocculated in water to a high solids content slurry, but was entirely unsuitable for bulk shipment, storage or feeding.

There do not exist generally accepted criteria for suitability for bulk storage and handling. Hence, the tests reported here were empirically devised. A material having good free-flowing properties as evaluated in terms of the angle of repose, might as a result of segregation, compaction or degradation, caused by vibration, aging or hygroscopicity, fail to demonstrate such properties after shipping or storage in bulk. The following tests were designed to duplicate in kind, but exceed in severity the conditions which might be met in such shipment or storage.

Impact compaction.—A sample of dried powder, about 100 ml. is poured loosely into a wooden ring 2½ inches I.D., placed on a firm surface. A close fitting plunger is placed on top of the barium carbonate, and the plunger is struck at least ten heavy blows with a rubber-faced, steel hammer. If the material so compacted is at all coherent, the product is judged from questionable to unsatisfactory, depending on the degree of coherence. Material produced in Examples 1, 6, and 10 showed no tendency to cohere at all, those of Exampes 5, 11, and 12 showed coherence ranging from slight to strong.

Bulk density.—A fixed weight of material is placed in a 250 ml. graduated cylinder and compacted by dropping the cylinder 100 times from a height of 2" onto a slightly resilient surface. The difference between the height before compacting, and after such compaction, is a measure of the tendency to settle under vibration. Material produced in Examples 1 and 10 showed about 10% compaction, and after the test poured freely from the graduate. Other materials tested not only showed lower initial bulk density and higher percentage compaction (ranging as high as 20% or over) but also would not pour out of the graduate at the end of the test. The degree of compaction was such that in some instances the graduate had to be tapped sharply to remove the material and in still others, the materials had to be dug out with a spatula. Similar results were obtained when materials were placed under a static loading equivalent to twelve feet of material on an electric vibrator for 24 hours.

Samples of the product of the present invention have been submitted to Shippers Car Loading Division of American Car Foundry for testing and have been found suitable for bulk shipment. Further, bag samples of this material were placed on the bottom tier of bags loaded on pallets and shipped from Cartersville, Georgia to Elgin, Tex., and returned via LCL freight. Sampling of these bags showed neither particle size segregation nor particle degradation. The material when retested as above was still suitable in every detail.

In order to test the durability of these particles under blending conditions, an equal weight blend was prepared with a glassmaker's sand. This blend was analyzed by screen analysis as initially prepared, and after various time periods, up to 24 hours, tumbling in a rotating drum. The results as shown in Table II, show no degradation of the carbonate in the very severe test.

TABLE II

| Percent | $BaCO_3$ | Sand | After mixing | 1 hour rolling | 4 hours rolling | 12 hours rolling | 24 hours rolling |
|---|---|---|---|---|---|---|---|
| Screen: | | | | | | | |
| +30 | 0.7 | 5.6 | 3.2 | 2.9 | 2.9 | 3.5 | 2.8 |
| +40 | 2.7 | 29.4 | 16.6 | 15.8 | 16.3 | 17.5 | 20.5 |
| +50 | 13.2 | 31.6 | 22.1 | 23.0 | 23.4 | 22.1 | 20.2 |
| +70 | 41.1 | 19.4 | 30.8 | 31.7 | 31.3 | 31.4 | 30.1 |
| +100 | 25.1 | 8.9 | 16.7 | 16.6 | 16.5 | 16.1 | 16.2 |
| +140 | 12.3 | 4.5 | 7.8 | 7.4 | 7.3 | 7.4 | 7.6 |
| +200 | 3.8 | 0.7 | 2.0 | 2.0 | 1.8 | 1.7 | 1.8 |
| +325 | 0.9 | 0.1 | 0.5 | 0.4 | 0.4 | 0.3 | 0.4 |
| −325 | 0.2 | 0.0 | 0.1 | 0.2 | 0.1 | 0.1 | 0.3 |
| Bulk density, lbs./cu. ft.: | | | | | | | |
| Loose | 73.7 | 86.8 | 80.3 | 80.7 | 81.2 | 80.9 | 81.8 |
| Tapped | 83.2 | 101.1 | 92.8 | 93.1 | 92.6 | 93.2 | 94.8 |

The selection of binders and deflocculant in some measure may be dictated within the limits described above by the limitations of the end use. Bentonitic clays, which are good binders for the spray drying process as well as efficient and effective thickeners in the fluid storage and use processes, are unsuitable for many fine ceramic uses because of their relatively high iron content. Silicates which can be tolerated and may even be desirable in glass mixes, do not, in all instances, give viscosity-stable fluids. This depends on the compatibility of the selected silicate and selected deflocculant for any particular system but can be determined by routine tests. Materials bound with silicates are not in general as readily water redispersible although admixture immediately prior to atomization is practical. Organics, starches, gums and synthetic polymers in general are more expensive, though useful in certain cases. Within the conditions outlined above, there are a large number of suitable binders which may in general be described (with the exception of bentonite) as water soluble, film forming materials chemically compatible with barium carbonate and not incompatible with the disperse system barium carbonate-deflocculantwater. These may, in many cases, actually function as both deflocculants and binders (e.g., many cellulose by-products, starches, dextrins and natural gums). Thus, in keeping with the foregoing, it will be recognized that sodium and potassium silicates will find particular use as binders in preparation of barium carbonate products for use in the glass industry. However, bentonite is particularly useful in the preparation of aqueous suspensions and dispersions, since it provides a product having a superior rewetability. In the glass industry, of course, rewetability is not a significant consideration. One of the preferred binders for use in preparation of a product for aqueous dispersion is a mixture of sugar, molasses, or the like, with bentonite. A silicate-bentonite mixture is also particularly useful, but the selection of a particular silicate will depend to a great extent on the characteristics of the final particle desired. Thus, if sodium metasilicate ($Na_2O:SiO_2$ ratio of 1) is employed, the final spray-dried particle will be harder, but also more hygroscopic than if sodium silicate ($Na_2O:SiO_2$ ratio of the order of 3.2) is employed. A product is considered rewetable for the purposes of the resent invention when it is characterized by becoming fluid upon the addition of water without agitation. The product is considered unduly hygroscopic for the purposes of the present invention, when, upon exposure to air, it loses its generally free-flowing characteristics. It should be further evident from the foregoing, that the requirement that the dispersant and the binder be compatible, requires that the binder does not destroy or interfere with the deflocculant characteristics of the dispersant.

In the high solids content deflocculated barium carbonate slurries described in U.S. Pat. No. 3,322,683, it was pointed out that not only were the individual crystalites released from the forces which bound them into more or less open "brush-heap" aggregates in which they normally occurred, but as a corollary of this release, in the preferred materials they actually were thereby permitted to approach each other more closely while still maintaining freedom of movement and fluidity. The normal particles are held in structured forms such that when suspended in a liquid, they can come into physical contact with each other only to the extent the structures can come into contact, and large amounts of fluid can be retained in and around the structures. The deflocculated materials, comprising individual particles set free from each other, can be far more concentrated before they actually come into physical contact. In the prior invention of U.S. 3,322,683, the highly concentrated systems still contained sufficient fluid to permit close approach of the particles to each other without physical contact. Under these conditions, the highly concentrated fluids still behave as substantially Newtonian fluids. However, the solids content cannot be increased without limit, and the borderline between Newtonian and non-Newtonian behavior for a thoroughly deflocculated material is quite narrow. FIG. 2 is a typical curve of viscosity versus solids content for such a material. This figure is exemplary only. The value of the abscissa at which the curve turns upward is dependant on a number of properties of the individual system including shape of particles, size of particles, degree of deflocculation, nature and amount of colloidal protectant, etc. The borderline of grossly non-Newtonian behavior may vary from about 70% solids for a needle-like crystal or a poorly dispersed system, to over 85% solids for a thoroughly deflocculated system with low viscosity protectant and almost equant crystals of about 1 micron average particle size. Thus, at best, in theory the particles or crystallites in the fluid state are physically free to move and flow, but the removal of a very small amount of water will result in a highly structured body. Even in this structured body, flow will continue to much higher solids at low values of sheer force, and density measurements on dried particles show that densification during drying may continue even beyond the theoretical density for close packed spheres.

Thus the present invention is based on the establishment of conditions compatible with this system and which do not appear to disturb it. The initial highly fluid (though high solids content) droplet leaving the spraying nozzle is brought into a spherical shape almost instantly by the forces of surface tension. Almost immediately evaporation starts from the surface as heat diffuses inward from the surface. As this water evaporates, the force of surface tension causes the crystallites to concentrate in the fluid. However, only a relatively small amount of water is removed before the system has shrunk into the field of non-Newtonian behavior, and the flying droplet becomes highly structured. From the time when the crystallites come into contact until a quite solid particle results the forces of surface tension, if not disturbed, will "jostle" the crystallite into a closer and closer array. If steam should be produced within this droplet, either as a result of too fast heat transfer or as a result of the formation of a water impervious film on the outside of the droplet, the force of surface tension is overcome, the particle disrupted or the system disturbed. In the successful drying cycle, the crystalites of which the particle is composed finally are brought into a dense structure substantially free from internal voids, with many surface-to-surface contacts, among particles which are bound by the binding compound into a firm, dense, smooth surfaced particle. The foregoing explanation is, of course, based on observation coupled with theoretical considerations and represents a belief but not a scientific certainty. Accordingly, it should not be construed as a limitation on the practice of the invention or on the claims.

The successful operation of the invention will, therefore, result in discrete, generally spherical particles having surface conditions such that the particles do not tend to adhere to each other, and further characterized by internal structure consisting of closely packed crystallites substantially free from internal voids, at least from such voids as are as large as the size of the crystallites themselves. While this structure may not be described as "regularly closepacked," it is certainly far denser than that which is described as "brush heap" and is free from either expansion bubbles or shrinkage voids of significant size. Such particles thus have enhanced bulk density, remarkably enhanced free-flowing properties and sufficient durability to stand the "rough and tumble" conditions of bulk handling shipment and storage, and are of suitable particle size to blend with other ingredients without tendency to degrade or segregate.

All of the examples were carried out with barium carbonate for illustrative purposes. Barium carbonate has properties and commercial application which serve to illustrate the problems associated with the use of alkaline earth metal carbonates generally and thus equally illustrate the more significant aspects of the present invention. It is to be understood that the invention is of broader application and is effective for treatment of all of the alkaline earth metal carbonates, including, without limitation, calcium carbonate, barium carbonate, magnesium carbonate and strontium carbonate, as well as the co-crystallized and/or physical mixtures thereof.

In the foregoing discussion of the invention, the product was described as produced by a spray-drying operation. While it will be recognized on review of the foregoing, that the spray-drying technique is by far the superior method for producing the product of the present invention, other techniques can be employed for this purpose. Thus, the dispersions which are defined herein as suitable as feed for the spray-drier can also serve as feed to a tumbling drum drier (sometimes referred to as a "sweetie-barrel"). The continuous tumbling of the material in the drum-type drier coupled with the continuous passage of hot gases into the drier causes the continuous removal of water from the material with the ultimate effect of formation of generally spherical particles. It is charcteristic of such driers, however, that they tend to produce larger particles than might generally be desired for the purposes of the present invention, and great care must be exercised if particles of suitable size are to be obtained. Other techniques which may be used for producing the product of the present invention are described in Chemical Engineers' Handbook, fourth edition, McGraw-Hill Book Company, Inc., 1963 (Perry et al., Editors) in the section entitled "Size Enlargement" beginning at 8–59). It is not necessary that the feed to the various devices described therein be in the fluid and/or paste form. Thus, while difficult, it is possible to produce the product of the present invention by blending all of the components except the water and dry-feeding the materials into contact with an atomized spray of water into the devices described in Chemical Engineers' Handbook as useful for such feeds. Again, it must be recognized that it is difficult to obtain generally spherical, discrete particles by this technique. Finally, there are a number of fluo-solids driers and calciners which may be employed, with appropriate modification of the feed, to produce the product of the present invention. The modifications referred to are within the routine skills of the art, merely involving adaptation of the principle defined herein to the specific requirements of the drier contemplated.

What is claimed is:

1. A spray-dried reactive composition consisting essentially of (a) a major amount of a mixture of (i) at least one alkaline earth metal carbonate having an average particle size of from about 0.25 to about 5 microns and (ii) a substantial amount of a water-insoluble oxidic metal compound reactive with said alkaline earth metal carbonate at the calcination temperature of said carbonate, said oxidic metal compound selected from the group consisting of silicon dioxide, titanium dioxide, iron oxide and compounds decomposable to said oxides at the calcination temperature, (b) an effective amount up to about 2% of a dispersant for said mixture, said dispersant being markedly hydrophilic in aqueous systems, and (c) a binding amount up to about 5% of a film-forming binder, said spray-dried composition characterized as consisting essentially of generally spherical particles, the major proportion of which has a particle size in the range of −30 to +300 mesh.

2. A composition in accordance with claim 2 wherein the alkaline earth metal carbonate is barium carbonate.

3. A composition in accordance with claim 2 wherein said oxidic metal compound is iron oxide.

4. A composition in accordance with claim 2 wherein said oxidic metal compound is titanium dioxide.

5. A process for the production of a reactive composition which comprises preparing an aqueous dispersion containing at least 50% solids by weight and consisting essentially of (a) a major amount of a mixture of (i) at least one alkaline earth metal carbonate, having an average particle size of from about 0.25 to about 5 microns, and (ii) a substantial amount of water-insoluble oxidic metal compound reactive with said alkaline earth metal carbonate at the calcination temperature of the alkaline earth metal carbonate, said oxidic metal compound selected from the group consisting of silicon dioxide, titanium dioxide, iron oxide and compounds decomposable to said oxides at the calcination temperature, (b) a minor amount of water, (c) an effective amount up to about 2% of a dispersant for said mixtures, said dispersant being markedly hydrophilic in behavior in aqueous solutions and (d) a binding amount up to about 5% of a film-forming binder and spray drying said dispersion to generally spherical particles, a major proportion of which has a particle size in the range of −30 to +300 mesh.

6. A process in accordance with claim 5 wherein said alkaline earth metal carbonate is barium carbonate.

7. A process in accordance with claim 5 wherein said alkaline earth metal carbonate is strontium carbonate.

8. The product produced by calcining a spray-dried reactive composition consisting essentially of (a) a major amount of a mixture of (i) at least one alkaline earth metal carbonate having an average particle size of from about 0.25 to about 5 microns and (ii) a substantial amount of a water-insoluble oxidic metal compound reactive with said alkaline earth metal carbonate at the calcination temperature of said carbonate, said oxidic metal compound selected from the group consisting of silicon dioxide, titanium dioxide, iron oxide and compounds decomposable to said oxides at the calcination temperature, (b) an effective amount up to about 2% of a dispersant for said mixture, said dispersant being markedly hydrophilic in aqueous systems, and (c) a binding amount up to about 5% of a film-forming binder, said spray-dried composition characterized as consisting essentially of generally spherical particles, the major proportion of which has a particle size in the range of −30 to +300 mesh at a temperature sufficient to react said carbonate and said oxidic metal compound.

9. A composition comprising a mixture of an alkaline earth metal carbonate product consisting essentially of generally spherical particles, a major portion of which are in the particle size range of −30 to +300 mesh and characterized by a specific gravity exceeding 40% of the theoretical value for the particle composition, the composition of said product consisting essentially of a major amount of at least one alkaline earth metal carbonate having an average crystalite size of from about 0.25 to about 5 microns, an effective amount up to about 2% of a dispersant for said alkaline earth metal carbonate, said dispersant being hydrophilic in aqueous systems, and a binding amount up to about 5% of film-forming binder, with sand in glass-forming proportions, the major portion of particles in said mixture being finer than 30 mesh and coarser than 200 mesh, the particle size distribution of the alkaline earth metal carbonate product contained in said mixture being substantially the same as for the other ingredients comprising said mixture.

10. A composition comprisign a mixture of a spray-dried alkaline earth metal carbonate product consisting essentially of generally spherical particles, a major portion of which is in the particle size range of −30 to +300 mesh and characterized by a specific gravity exceeding 40% of the theoretical value for the particle composition, the composition of said product consisting essentially of a major amount of at least one alkaline earth metal carbonate having an average crystalite size of from about 0.25 to about 5 microns, an effective amount up to about 2% of a dispersant for said alkaline earth metal carbonate, said dispersant being markedly hydrophilic behavior in aqueous systems, and a binding amount up to about 5% of a film-forming binder, or mixtures of such binders, with sand in glass-forming proportions, the major portion of particles in said mixture being finer than 30 mesh and coarser than 200 mesh, the particle size distribution of the alkaline earth metal carbonate product contained in said mixture being substantially the same as for the other ingredients comprising said mixture.

11. In the process for the production of glass in which an alkaline earth metal carbonate and sand are mixed and melted to effect interaction therebetween for the formation of a glass composition, the improvement which comprises employing an alkaline earth metal carbonate product consisting essentially of generally spherical particles, a major portion of which are in the particle size range of −30 to +300 mesh and characterized by a specific gravity exceeding 40% of the theoretical value for the particle composition, the composition of said product consisting essentially of a major amount of at least one alkaline earth metal carbonate having an average crystalite size of from about 0.25 to about 5 microns, an effective amount up to about 2% of a dispersant for said alkaline earth metal carbonate, said dispersant being markedly hydrophilic in aqueous systems, and a binding amount up to about 5% of film-forming binder, as the alkaline earth carbonate component, the particle size range and particle size distribution of said alkaline earth carbonate product being substantially matched to the corresponding characteristics of said sand.

12. The product produced by calcining an alkaline earth metal carbonate product consisting essentially of generally spherical particles, a major portion of which are in the particle size range of −30 to +300 mesh and characterized by a specific gravity exceeding 40% of he theoretical value for the particle composition, the composition of said product consisting essentially of a major amount of at least one alkaline earth metal carbonate having an average crystalline size of from about 0.25 to about 5 microns, an effective amount up to about 2% of a dispersant for said alkaline earth metal carbonate, said dispersant being markedly hydrophilic in aqueous systems, and a binding amount up to about 5% of film-forming binder, at a temperature sufficient to produce crystalline growth of said alkaline earth metal carbonate.

References Cited
UNITED STATES PATENTS

| | | | |
|---|---|---|---|
| 2,540,182 | 2/1951 | Albert | 106—308 B |
| 2,663,695 | 12/1953 | Perloff et al. | 106—306 |
| 3,118,782 | 1/1964 | Hoge et al. | 106—306 |
| 3,197,322 | 7/1965 | Maskal et al. | 106—306 |
| 3,322,683 | 5/1967 | Lester | 106—306 |

MAYER WEINBLATT, Primary Examiner

I. GLUCK, Assistant Examiner

U.S. Cl. X.R.

106—306, 308 B, 309; 252—313 R, 383, 385; 423—421